Figure 1:
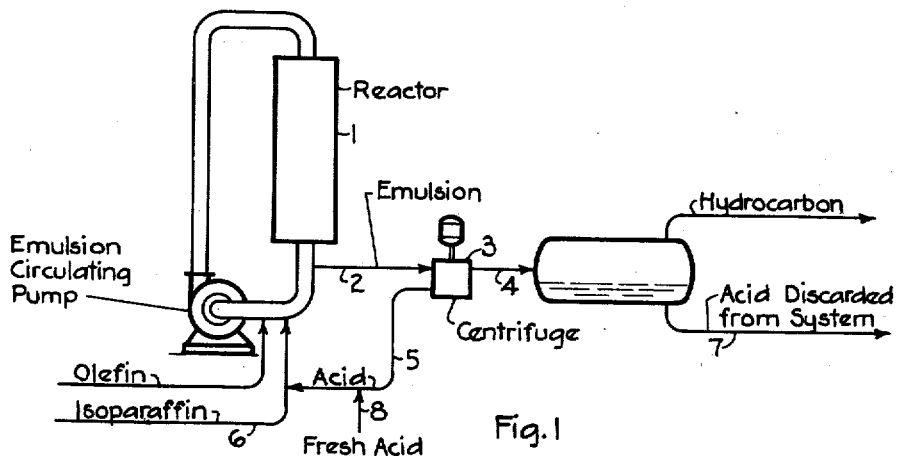

Inventor: Johannes H.A.P. Langen Van der Valk
By his Attorney: Millard L. Caldwell

UNITED STATES PATENT OFFICE 2,428,506

ALKYLATION PROCESS

Johannes H. A. P. Langen Van der Valk, Oakland, Calif., assignor to Shell Development Company, San Francisco, Calif., a corporation of Delaware Application April 29, 1941, Serial No. 390,955

2 Claims. (Cl. 260—683.4)

This invention relates to the reaction of saturated aliphatic compounds having a tertiary carbon atom, particularly branched chain paraffins and naphthenes, with alkylating or aralkylating agents or suitable substitution products thereof. It deals with a more advantageous method for carrying out such reactions in the presence of strong inorganic acid alkylation catalysts.

The alkylation of isoparaffins with olefines in the presence of concentrated sulfuric acid has proven highly successful and has been widely adopted by the petroleum industry as the most advantageous method for the production of premium motor fuel components. Therefore, the invention will be described with particular reference to its application to this reaction. It will be understood, however, that the invention may be applied with advantages in other alkylation reactions using the same or other catalysts and/or alkylating agents.

One of the chief disadvantages of previous methods of alkylating isoparaffins has been the relatively rapid rate at which the sulfuric acid loses its effectiveness in catalyzing the desired alkylation. An important object of the present invention is to overcome this difficulty and to provide a method of operation whereby the effective life of the catalyst acid in reactions of this type may be increased. Another object is to provide smoother and more uniform operation of alkylation processes. Further objects are to increase the yield and quality of the alkylation products obtainable from isoparaffins and olefines. Although the invention is not limited thereto, it is particularly applicable to the production of motor fuels and a special object is to improve on former methods of manufacturing gasoline components from lower boiling isoparaffins. Still other objects and advantages of the invention will be apparent from the following description.

In the commercially successful processes for alkylating isoparaffins with olefines in the presence of sulfuric acid, the catalyst acid and reactants are emulsified under suitable reaction conditions, the most important of which are that a large excess of isoparaffin to olefine is present in the reaction and that a relatively low temperature of the order of about 0° C. to about 30° C. is maintained. In continuous methods of operation a part of the emulsion is diverted continuously to a separator in which the phases are separated. Alkylation products are recovered from the separated hydrocarbon phase and the acid phase is returned to the reaction. Usually, in order to recover a given volume of product, several volumes, generally ten or more volumes, of acid must be passed through the separator. A part of the separated acid phase is replaced, batchwise or continuously, by sufficient fresh acid to maintain the catalytic activity of the acid at a suitable effective level. A preferred method of carrying out alkylations of this type is described in United States Patent 2,211,747, for example.

Average times of contact of acid and hydrocarbon of about 10 to 100 minutes have been employed for reaction of isoparaffins with olefines in the presence of sulfuric acid but, commercially, 20 to 60 minutes are used. In general, the time required for separation of the acid and hydrocarbon phases is not less than 30 minutes and may, in certain cases, be of the order of 2 hours. Up until reaching the separator, the emulsion is carefully maintained under good alkylating conditions, particularly intimate contact of isoparaffin with acid, but in the separator everything is done to remove hydrocarbons, including isoparaffin, from the acid. This undesirable condition of the acid, namely, its existence out of contact with isoparaffin during a substantial part of its period of use in the process, appears to be responsible for, or at least to contribute materially to, the more rapid deterioration of the acid and lower yields of product heretofore obtained. According to the present invention, the disadvantages of prior alkylation methods are overcome or reduced by carrying out the process so that the time during which the acid is out of contact with isoparaffin is as short as possible.

Figure 2:
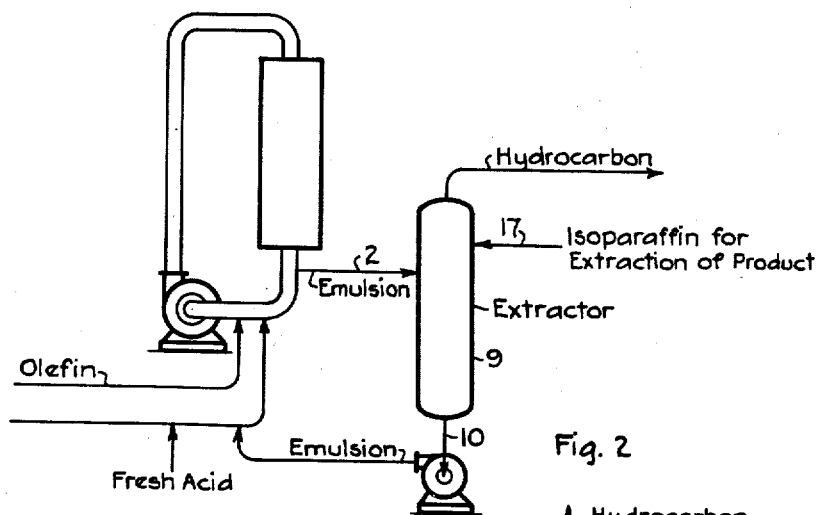
Figure 3:
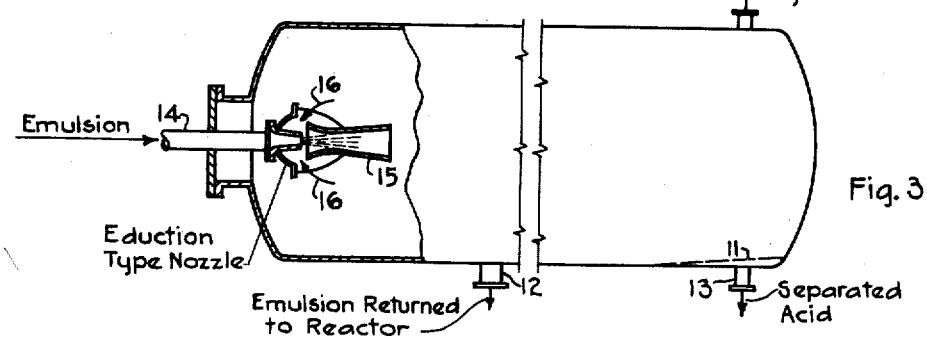

The attached drawings show, diagrammatically, arrangements of apparatus suitable for carrying out the invention, the different figures illustrating the use of different separation methods in the process. Figure 1 is a flow-diagram of one method of carrying out the invention using a centrifuge to separate the acid to be returned to the alkylation. Figure 2 illustrates the use of extraction with the isoparaffin being alkylated as the means for reducing undesirable side reactions in the acid during its separation from the product while Figure 3 shows a modification of the process in which an eduction nozzle is used in a decantation tank for promoting more rapid separation of the acid while maintaining it in contact with the desired isoparaffin.

The method of applying the invention shown in Figure 1 of the drawing is to feed the stream of reaction mixture which is diverted from the reactor 1 by line 2 for separation of product to a centrifuge 3 in which a quick separation of acid and hydrocarbon may be effected. It is not necessary that the separation be complete, however, since the hydrocarbon can then pass through line 4 to a further separator for more complete removal of acid while the separated acid is quickly returned by line 5 to the system for intimate contact with isoparaffin as in line 6. Most preferably, all the acid returned to the reaction is quickly separated and only that to be withdrawn from the system by line 7 and replaced by fresh acid admitted by line 8 is subjected to a second separation, but improvements are obtained even when a part of the more slowly separating acid is also returned to the reaction since the average time during which the acid is out of contact with sufficient isoparaffin to suppress undesired side reactions will still be greatly reduced.

Another method for reducing the time during which undesirable side reactions in the acid are favored by the absence of sufficient isoparaffin is to carry out the separation of product by extraction with the isoparaffin being alkylated. This may be accomplished, for example, as shown in Figure 2 of the drawing by introducing the mixture to be separated by line 2 into a vessel 9 maintained substantially full of isoparaffin containing hydrocarbon, through which the acid may settle in constant intimate contact with the isoparaffin and be promptly withdrawn by line 10 at the bottom while introducing the isoparaffin for the extraction by line 17. Improved results may also be obtained when using any suitable decantation equipment by carrying the acid level in the separator as low as possible as indicated by line 11 in Figure 3 for example, thereby materially reducing the time available for undesirable reactions in the separated acid. The operation of the usual separators may be further improved by withdrawing acid from which the undissolved hydrocarbon has not completely separated and returning this mixture to the reaction. This may conveniently be effected by providing an extra draw-off line 12 in Figure 3 located about in the middle or more preferably even nearer the inlet of the entering emulsion stream. In this way at least half, or preferably at least 75%, or more preferably 90% or more, of the acid may be returned to the reaction without having ever been out of contact with isoparaffin while only a small part of the acid is being removed through the acid outlet 13 in Figure 3 at the rear end of the separator to provide acid for lubrication of the emulsion circulating pump and the acid removed from the system in order to permit replacement by fresh acid. The time required for separation of acid and hydrocarbon may be reduced by providing positive mixing of the emulsion to be separated with hydrocarbon, advantageously with separated hydrocarbon phase from the emulsion, for example. In this way more rapid demulsification may be achieved as a result of increasing the ratio of hydrocarbon to acid in the mixture, while at the same time the acid is left in the desired intimate contact with isoparaffin. This may be advantageously achieved, as shown in Figure 3 for example, by feeding the emulsion by line 14 into the separator through an eduction-type nozzle 15 arranged to draw separated hydrocarbon phase represented by the arrows 16 into the feed stream. Another method of reducing the time required for phase separation is by adding to the reaction mixture an emulsion breaking agent which is unattacked under the conditions of use and is not detrimental to the reaction. Such agents are preferably used only in small amounts sufficient to increase the rate of phase separation and so decrease the time which the acid to be returned to the reaction is out of contact with the isoparaffin being alkylated. Still other methods of reducing the time which the acid is out of contact with effective amounts of isoparaffin may be used; thus, for example, demulsification can be hastened by cataphoresis or by supersonic vibrations, or other suitable ways.

Still another method of reducing undesirable side reactions in the acid is to disperse the acid streams, e. g., the fresh acid or the separated recycle acid or both, but particularly the fresh acid, with olefine-free isoparaffin, most advantageously relatively pure isobutane such as may be recovered from the product when alkylating this isoparaffin before the acid is contacted with olefine or other alkylating agent. In this way, the possibility of undesirable reactions resulting from too slow or incomplete mixing of the reactants may be reduced as well as those which might take place in the separated recycle acid during its return to the reaction.

As previously pointed out, an important feature of the invention is to make the time the acid is out of intimate contact with isoparaffin as short as possible. Such time may be expressed as minutes or seconds, or as a percentage of the total time the acid is in use, that is, the total of the reaction and separation times, or as a percentage of the reaction time, or the like. Thus, for example, where centrifugal separation is used, the time during which the acid is out of contact with isoparaffin may be of the order of about 1 minute. In case a separator provided with a central draw-off for return of emulsified acid to the reaction is used, the average time the acid is out of contact with isoparaffin may be of the same order as in centrifugal separation since although a small amount of the acid returned to the reaction, for example via the circulating pump packing gland, may be out of contact with isoparaffin for times as long as those now used commercially for the separation of all of the acid, say 30 minutes or more, the amount of this separated acid is small in comparison to the amount of unseparated acid and it therefore has proportionately less influence on the acid life. The average time the acid may be out of contact with isoparaffin may be longer than the preferred 1 or 2 minutes, and an improvement will be obtained, provided such time is shorter than the time now used in commercial plants where the acid is out of contact with isoparaffin for an average of 30 to 40 minutes. Other things being equal, the shorter the contact time in the reactor, i. e., the higher the feed rate based on acid or acid and hydrocarbon volume in the reaction system, the shorter should be the time during which the acid is out of contact with isoparaffin if the same benefit is to be derived from the invention. The temperature of the acid during the time it is exposed to conditions unfavorable to alkylation influences the time it may be kept under such conditions without disadvantageous results and, by suitable cooling, it is feasible to increase the periods during which the acid may be out of contact with isoparaffin. In general, it is preferred that the average time of residence of the acid in the separation stage be not more than 20 minutes or more, preferably less than 10 minutes.

In factory scale operations, the process of the invention has resulted in increases in acid life.

of 50% or more, namely, from about 20 to 30–40 volumes of crude alkylate per volume of acid, when alkylating isobutane with normal butylenes using sulfuric acid of at least 98% initial concentration which is withdrawn from the system at about 89%. The yield of the total alkylate, based on the olefine used, is improved by about 1% to 2%. These improvements are effected by reducing the average time the acid is out of contact with sufficient isobutane to keep the acid substantially saturated therewith from about 100% to about 10% or less of the average time of contact of acid and hydrocarbon in the reactor.

To demonstrate the advantages of the invention, carefully controlled comparative tests were carried out in which the only variable was the time the acid was out of intimate contact with the isoparaffin being alkylated. The isoparaffin used was isobutane which was alkylated with the residual butylene content of a butane-butylene fraction which had been subjected to hot sulfuric acid polymerization in accordance with U. S. Patent 2,174,247. The alkylation apparatus used was that described in U. S. Patent 2,232,674. The following reaction conditions were employed:

| | |
|---|---|
| Isobutane to olefine ratio in the feed_____mols__ | 5.77–5.95 |
| Internal recycle (volumes of hydrocarbon per volume of feed)_____ | 20 |
| Volumes of acid per volume of hydrocarbon in the reactor_____ | 1 |
| Average residence time of hydrocarbon in the reactor_____min__ | 20 |
| Reactor temperature_____°C__ | 5 |
| Mol percent isobutane in the feed____ | 58.2–58.3 |
| Mol percent olefine in the feed_____ | 9.8–10.1 |
| Reaction pressure (pounds per square inch gage)_____ | 60 |
| Fresh acid concentration (weight percent H$_2$SO$_4$)_____ | 99.6 |

During seven days the plant was operated so that the average time the acid was out of intimate contact with isobutane was about 9.9 minutes, and for ten days the time the acid was out of such contact averaged about 49 minutes. The results obtained were as follows:

| | | |
|---|---|---|
| Average time acid was out of contact with isobutane_____min__ | 9.9 | 49 |
| Acid life (volumes of alkylate per volume of acid at 89% acid concentration) _____ | 41 | 33 |
| Yield of alkylate (weight percent based on butylene fed) _____ | 204 | 200 |

Even better improvements may be obtained by the process of the invention when alkylating with propylene, isobutylene, cyclopentene, cyclohexene, amylenes, or higher olefines as, for instance, present in 70° C. end point cracked or reformed gasoline and the like. Instead of the olefines themselves, polymers thereof or esters, either organic or inorganic, corresponding to such olefines or polymers may be used. Inorganic or organic esters of primary alcohols such as methyl, ethyl, propyl, butyl, isobutyl and like alcohols may be employed as alkylating agents instead of the secondary and tertiary esters corresponding to the olefines. The process is also advantageous when ethers or alcohols are used as the alkylating agent. It may likewise be used when aralkylating agents such as, for example, benzyl alcohol, cinnamyl alcohol, the mono-chloroethyl benzenes, and the like or other substituted alkylating agents, as 1-chloro-butene-3, acetyl chloride, mesityl oxide, etc., are employed, and the expression "alkylating agent" will therefore be understood as referring generically to any compound capable of substituting an alkyl group, which may or may not contain one or more substituent elements or groups, for a hydrogen atom attached to a tertiary aliphatic carbon atom.

The invention is of particular advantage in alkylation processes involving absorption of one or more olefines from a fraction of cracking products in sulfuric acid or the like and reacting the resulting absorption products after separation of unabsorbed starting material with isobutane preferably in the presence of additional concentrated sulfuric acid as described and claimed in copending application, Serial No. 305,498, filed November 21, 1939. In such methods of operation there is great danger of undesirable reactions taking place in the absorption step or during separation of unabsorbed hydrocarbon or elsewhere in the system. As a result, the catalyst acid life in the process is usually materially lower than when the olefines are used directly in the alkylation. This loss of life of the catalyst acid may be materially reduced by promptly admixing the absorption product with isobutane or other isoparaffin prior to introducing the mixture into the alkylation zone. The absorption step itself may be carried out in the presence of sufficient isobutane to minimize undesired reactions. For example, sulfuric acid containing intimately admixed isobutane in excess may be agitated under sufficient pressure to maintain the isobutane in the liquid state while a gaseous propane-propylene fraction is passed through at such a rate that substantial propylene absorption takes place while the propane passes out of the system unaffected. The absorption product thus obtained may then be used to alkylate isobutane in the presence of additional sulfuric acid taking the same precautions to keep the acid in substantially continuous contact with isobutane throughout its period of use as previously described for direct alkylation with olefines.

The invention is not only of wide scope in regard to the alkylating agents which may be used, but also with respect to the tertiary aliphatic carbon atom-containing compounds which may be alkylated thereby and the alkylation acid catalysts which may be used. Thus, for example, instead of isobutane, isopentane, isohexane, 2,2,5-trimethyl hexane, methyl cyclopentane, methyl cyclohexane, ortho dimethyl cyclohexane and the like and suitable substitution products, as 1-chloro-4-methyl-pentane, etc., may be alkylated by the process of the invention. In place of sulfuric acid, halo-sulfonic acids or phosphoric acid or mixtures of sulfuric or phosphoric acids with boron fluoride and/or a hydrogen halide or other suitable agents may be used.

While the invention has been described with especial reference to the improvement of the preferred alkylation procedures involving continuous circulation of an emulsion of the catalyst acid and reactants through a closed circuit comprising a time tank and cooler under alkylation conditions and continuous diversion of a part of the emulsion to a separator in which hydrocarbon phase containing the product is separated from acid which is returned to the reaction, it is also applicable to other methods of carrying out the reaction. Thus, for example, it may be applied with advantage when the circulation of the emulsion is in a unitary reactor or when the entire emulsion is separated after reaction, as when the reactants and acid are mixed and passed through a suitable coil, tower or baffle tank or the like providing adequate time for reaction into a separator. Still other variations in the application of the invention may be made.

I claim as my invention:

1. In a process of alkylating an isoparaffin by reaction with an alkylating agent in the presence of concentrated sulfuric acid, the improvement which comprises withdrawing from the reaction zone at least a part of the resulting emulsified mixture and contacting it with isoparaffin substantially free from alkylating agents under conditions at which the acid content of the mixture is separated from at least a part of the reaction product while being maintained in intimate emulsified contact with said isoparaffin and promptly returning the thus separated acid emulsion for further alkylation.

2. In a process for alkylating an isoparaffin by reaction with an olefin in the presence of concentrated sulfuric acid wherein an emulsion of hydrocarbon and said acid is circulated in a closed circuit under alkylating conditions, a part of the circulating emulsion is continuously diverted from said circuit for recovery of alkylation product, and at least a part of the acid content of said diverted emulsion is returned to the circuit, the improvement which comprises bringing said diverted emulsion into direct contact with a substantial excess of the isoparaffin being alkylated in an extraction zone, thereby effecting the separation of alkylate from said emulsion while in intimate contact with a substantial excess of said isoparaffin, withdrawing hydrocarbons comprising alkylate from the upper part of said extraction zone, withdrawing acid in intimate emulsified contact with isoparaffin from the lower part of said extraction zone, and passing at least a part of said acid in intimate emulsified contact with sufficient isoparaffin to protect said acid from deterioration from the lower part of said extraction zone to said closed circuit.

JOHANNES H. A. P. LANGEN VAN DER VALK.

REFERENCES CITED

The following references are of record in the file of this patent:

UNITED STATES PATENTS

| Number | Name | Date |
|---|---|---|
| 2,244,556 | Holm et al. | June 3, 1941 |
| 2,245,038 | Holm et al. | June 10, 1941 |
| 2,246,703 | Thiele et al. | June 24, 1941 |
| 2,256,880 | Goldsby et al. | Sept. 23, 1941 |
| 2,311,144 | Wickham et al. | Feb. 16, 1943 |
| 2,341,863 | Goldsby | Feb. 15, 1944 |